Oct. 5, 1943.  H. E. BECKER  2,330,945
FILTER
Filed May 23, 1939    2 Sheets-Sheet 1
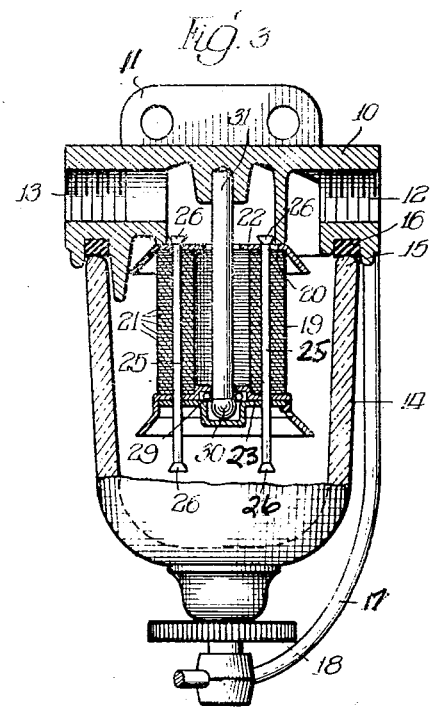
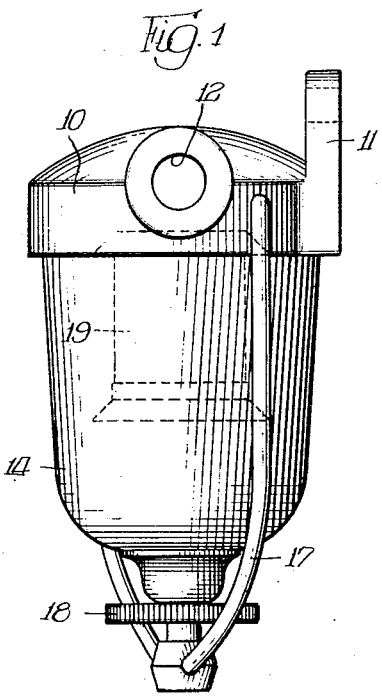
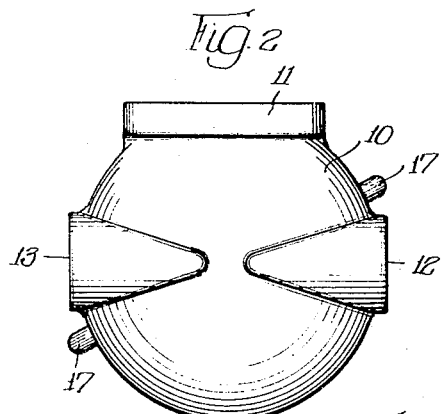
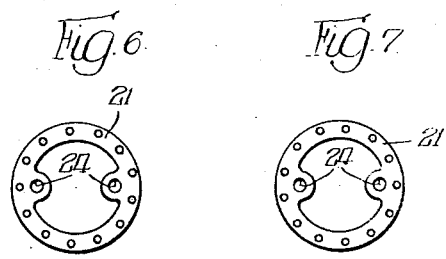
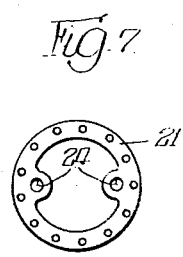
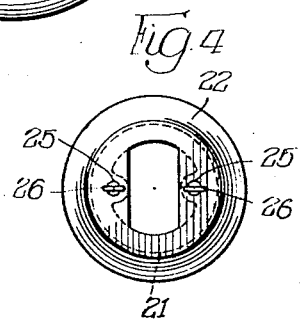
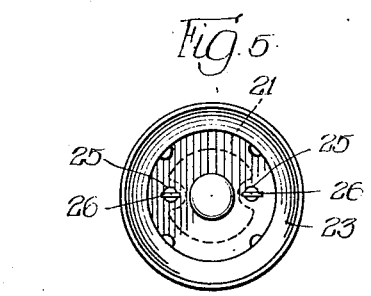
INVENTOR.
Henry E. Becker,
BY
Cromwell, Greist & Warden.
ATTORNEYS.

Oct. 5, 1943.                H. E. BECKER                2,330,945
                                FILTER
                           Filed May 23, 1939            2 Sheets-Sheet 2
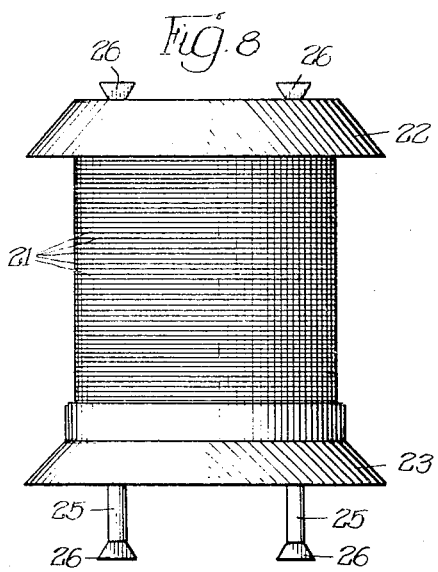
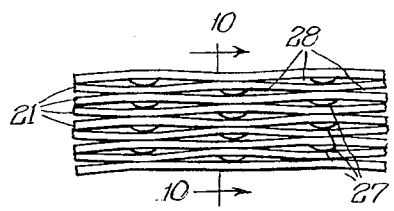
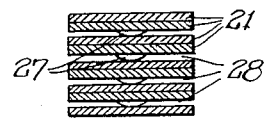
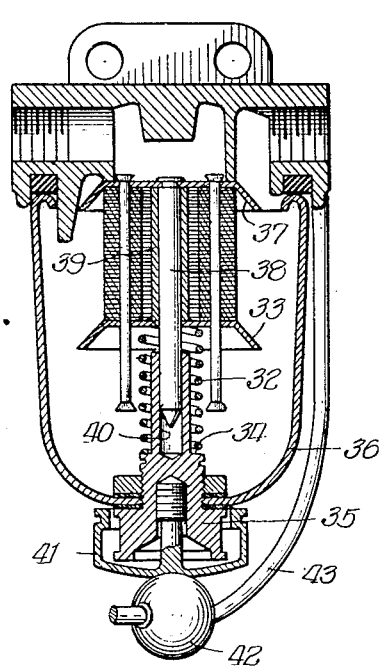
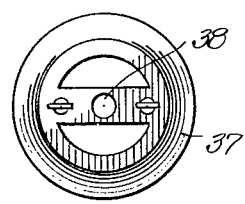
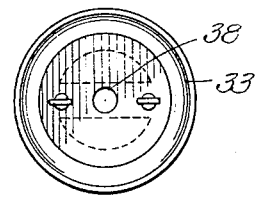
INVENTOR.
Henry E. Becker,
BY Cromwell, Greist + Warden.
ATTORNEYS.

Patented Oct. 5, 1943

2,330,945

UNITED STATES PATENT OFFICE 2,330,945

FILTER

Henry E. Becker, Chicago, Ill., assignor to Amalgamated Engineering & Research Corporation, Chicago, Ill., a corporation of Illinois Application May 23, 1939, Serial No. 275,239

6 Claims. (Cl. 210—169)

The present invention has to do with filters of the type used in connection with internal combustion engines for filtering the fuel supplied to such engines.

The principal object of the invention is to provide, in a filter of the type described, a flexible filter body which will effectively filter the fuel or other liquid passing through the same, can be easily removed, cleaned and replaced, and is self-cleansing to a degree. This flexible filter body is composed of a resiliently compressible stack of thin centrally apertured sheet metal disks, which disks are so constructed and arranged as to provide minute filtering passages between the same in the compressed condition of the stack.

While the foregoing statements are indicative in a general way of the nature of the invention, other more specific objects and advantages will be apparent to those skilled in the art upon a full understanding of the flexible filter body and the parts which have been combined to produce the same.

Two slightly different embodiments of the invention are presented herein for the purpose of exemplification, but it will of course be appreciated that the invention is susceptible of incorporation in other structurally modified forms coming equally within the scope of the appended claims.

In the accompanying drawings:

Fig. 1 is a side view of a filter equipped with the flexible filter body of the invention;

Fig. 2 is a top plan view of the filter;

Fig. 3 is a vertical section through the center of the filter;

Fig. 4 is a top plan view of the flexible filter body;

Fig. 5 is a bottom plan view of the body;

Fig. 6 is a top plan view of one of the disks in the body;

Fig. 7 is a top plan view of the next disk in the body;

Fig. 8 is an enlarged side view of the flexible filter body;

Fig. 9 is a highly magnified side view of a small portion of the body;

Fig. 10 is a vertical section, taken on the line 10—10 of Fig. 9;

Fig. 11 is a vertical section through the center of another filter containing a flexible filter body constructed in accordance with the invention;

Fig. 12 is a top plan view of the flexible filter body shown in Fig. 1; and

Fig. 13 is a bottom plan view of the same.

The filter shown in Figs. 1 to 10 inclusive will first be described. This filter includes a metal head 10 which is provided with an attaching flange 11, an inlet 12 and an outlet 13. The head 10 carries a glass bowl 14 which is removably held with its rim 15 clamped tightly against a gasket 16 on the underside of the head by a bail 17 which acts through a vertically adjustable pressure nut 18.

A filter body 19 of novel construction is positioned within the bowl 14 against an annular rim 20 on the underside of the head 10. The body 19 is both flexible and resiliently compressible. It is composed of a large number of thin centrally apertured sheet metal disks 21 which are arranged in a stack between a centrally apertured top plate 22 and a closed bottom plate 23. The disks 21 and the top and bottom plates 22 and 23 are provided at diametrically opposite points with small holes 24 through which two guide pins 25 pass. These pins are considerably longer than the flexible filter body when the disks are compressed together and allow the disks to separate from each other along the pins upon the compression being released. The pins 25 are provided at their upper and lower ends with small heads 26 which prevent the top and bottom plates and interposed disks from leaving the pins.

Each of the disks 21 is provided about its circumference with a large number of minute regularly spaced protuberances 27 which act to separate each disk slightly from the next disk at the locations of the protuberances. Each disk is provided with an odd number of the protuberances, and when being assembled is rotated 180° with respect to the next disk, whereby to stagger the protuberances 27 on each disk circumferentially with respect to those on the next disk. When the disks are pressed together the staggered protuberances create slight undulations in the disks about the circumferences of the same, and these undulations form fuel-filtering passages 28 between the disks at the locations of the protuberances. These passages are extremely narrow diamond-shaped slits, which slits because of their staggered arrangement give the flexible filter body a lattice-like appearance when viewed under a magnifying glass.

The flexible filter body 19 is resiliently compressible in the direction of its axis, much like a small cylinder of india rubber would be. After being compressed axially the body 19 is clamped tightly against the rim 20 on the underside of the head by a snap button device 29 mounted in the bottom plate 23, which device engages about an enlargement 30 on the lower end of a rod 31 carried by the head 10. The body 19 is snapped into place by merely pressing the same upwardly until the device 29 has sprung into locked engagement about the enlargement 30 on the rod. The body 19 can be easily removed from the assembly by merely pulling the bottom plate 23 downwardly with enough force to cause the device 29 to become unsnapped from the enlargement 30 on the rod. In the compressed and operative condition of the flexible filter body, the guide pins 25 will be suspended from the top plate 22 in the manner shown in Fig. 3.

When the body 19 is removed from the assembly, the disks 21 will spread out along the relatively long pins 25, allowing the body to be easily cleaned upon being immersed in gasoline or other cleansing liquid.

In the compressed operative condition of the body 19 the lateral flexibility and resilience of the disks 21 will cause the surfaces of the disks to wedge against and prevent the passage of any foreign particles between the same, and such particles will be cleared therefrom and dropped free of the narrow slit-like passages as a result of the reverse flow impulses usually produced in filters by the means employed for pumping the fuel.

In the modification shown in Figs. 11, 12 and 13, the snap button device of the first embodiment is replaced by a helical spring 32, which spring is compressed between the bottom plate 33 of the body and a shoulder 34 carried by a stud 35 in the bottom of the bowl 36. The top plate 37 of the flexible filter body is provided at its center with a downwardly extending rod 38, which rod passes downwardly through a sleeve 39 carried by the bottom plate 33 and telescopes at its lower end into a socket 40 provided in the upper portion of the stud 35. In this particular embodiment the bowl 36 is made of metal and is detachably held in position by a special nut 41 on the underside of the bowl, which nut screws downwardly into tight engagement with a ball 42 on the bail 43. The sleeve 39 is adapted to abut the under surface of the top plate 37 to limit the extent to which the disks can be pressed together by the action of the spring 32. The spring 32, in addition to compressing the disks, aids the latter in wedging foreign particles to prevent their entry, thereby assisting in the previously described self-cleansing action of the disks by increasing their resilient yieldability to forces tending to separate them.

The protuberances 27 are shown as rounded and as arranged in a circle in a single row, but it will of course be appreciated that the protuberances may be made in other shapes and in other arrangements.

I claim:

1. In a filter, a flexible filter body consisting of a resiliently compressible stack of thin centrally apertured sheet metal disks, means for creating slight undulations in the disks about the circumferences of the same when the stack is compressed, which undulations provide small circumferentially spaced filtering passages between the disks, means for preventing relative rotation of the disks in the stack, and means for holding the stack compressed.

2. In a filter, a flexible filter body consisting of a resiliently compressible stack of thin centrally apertured sheet metal disks, each of said disks being provided with a plurality of minute protuberances for separating each disk from the next disk, said protuberances flexing each disk to produce circumferentially extending undulations in the same when the stack is compressed, whereby to provide small filtering passages between the disks adjacent the protuberances when the stack is compressed, means for preventing relative rotation of the disks in the stack, and means for holding the stack compressed.

3. In a filter, a flexible filter body consisting of a resiliently compressible stack of thin centrally apertured sheet metal disks, each of said disks being provided with a plurality of minute protuberances which separate each disk from the next disk and flex the next disk intermediate the protuberances thereon, with the protuberances on each disk staggered circumferentially with respect to those on the next disk, whereby to provide small filtering passages between the disks adjacent the protuberances when the stack is compressed, means for preventing relative rotation of the disks in the stack, and means for holding the stack compressed.

4. In a filter, a flexible filter body composed of a large number of thin centrally apertured sheet metal disks which are identical with each other and are arranged in a stack, each of said disks being provided about its circumference with an odd number of minute protuberances for separating each disk from the next disk, and each disk being turned 180° with respect to the next disk to stagger the protuberances on each disk circumferentially with respect to those on the next disk, pins passing loosely through small holes in all of the disks for maintaining the latter in stacked relation, and readily releasable means for holding the stacked disks compressed.

5. In a filter, a flexible filter body composed of a centrally apertured top plate, a closed bottom plate, a large number of thin centrally apertured sheet metal disks stacked between said plates, readily releasable means acting through the bottom plate for holding the disks in a compressed condition, and guide pins passing loosely through small holes in the disks and plates, said pins preventing relative circumferential movement of the disks and being considerably longer than the filter body when the disks are compressed, whereby to allow the disks to separate from each other on the pins upon the compression being released without disturbing their circumferential relationship.

6. In a filter, a head, a flexible filter body which is resiliently compressible in the direction of its axis, and complementary snap button elements carried respectively by the head and the end of the body farthest removed from the head for attaching the body to the head in an axially compressed condition.

HENRY E. BECKER.